US006702884B2

(12) United States Patent
Brown

(10) Patent No.: US 6,702,884 B2
(45) Date of Patent: Mar. 9, 2004

(54) PIGMENTED HOT MELT INKS

(75) Inventor: Benjamin J. Brown, Keene, NH (US)

(73) Assignee: Markem Corporation, Keene, NH (US)

( * ) Notice: Subject to any disclaimer, the term of this patent is extended or adjusted under 35 U.S.C. 154(b) by 51 days.

(21) Appl. No.: 10/032,132

(22) Filed: Dec. 31, 2001

(65) Prior Publication Data

US 2003/0127021 A1 Jul. 10, 2003

(51) Int. Cl.[7] .......................... C09D 11/00; C09D 11/12
(52) U.S. Cl. .................................................. 106/31.61
(58) Field of Search ...................... 106/31.61

(56) References Cited

U.S. PATENT DOCUMENTS

| 4,814,786 | A | | 3/1989 | Hoisington et al. | 346/1.1 |
|---|---|---|---|---|---|
| 5,053,079 | A | | 10/1991 | Haxell et al. | 106/31 R |
| 5,221,335 | A | | 6/1993 | Williams et al. | 106/23 |
| 5,235,350 | A | | 8/1993 | Lin et al. | 346/140 |
| 5,259,873 | A | | 11/1993 | Fujioka | 106/20 |
| 5,350,446 | A | | 9/1994 | Lin et al. | 706/27 |
| 5,397,388 | A | | 3/1995 | Fujioka | 106/28 |
| 5,405,438 | A | | 4/1995 | Fujioka | 106/27 |
| 5,531,819 | A | | 7/1996 | Sawada | 106/31 R |
| 5,592,204 | A | | 1/1997 | Lin et al. | 347/88 |
| 5,607,501 | A | | 3/1997 | Fujioka | 106/22 |
| 5,662,736 | A | | 9/1997 | Sakai et al. | 106/31.29 |
| 5,669,965 | A | | 9/1997 | Sawada et al. | 106/31 R |
| 5,906,678 | A | * | 5/1999 | Fujiyama et al. | 106/31.29 |
| 5,919,839 | A | * | 7/1999 | Titterington et al. | 523/161 |
| 5,922,114 | A | | 7/1999 | Sawada | 106/31.29 |
| 5,932,630 | A | | 8/1999 | Kovacs et al. | 523/161 |
| 5,954,865 | A | | 9/1999 | Sawada | 106/31.29 |
| 5,980,621 | A | | 11/1999 | Inaishi et al. | 106/31.29 |
| 6,019,829 | A | * | 2/2000 | Omae et al. | 106/31.65 |
| 6,106,602 | A | * | 8/2000 | Ouchi et al. | 106/31.61 |
| 6,121,345 | A | | 9/2000 | Sawada | 523/160 |
| 6,132,500 | A | | 10/2000 | Inaishi | 106/31.31 |
| 6,147,937 | A | | 11/2000 | Arikawa et al. | 368/242 |
| 6,153,667 | A | | 11/2000 | Howald | 523/160 |
| 6,235,094 | B1 | | 5/2001 | Banning et al. | 106/31.29 |
| 6,235,098 | B1 | | 5/2001 | Maekawa et al. | 106/31.61 |
| 6,245,135 | B1 | | 6/2001 | Jaeger et al. | 106/31.29 |
| 6,336,965 | B1 | * | 1/2002 | Johnson et al. | 106/31.6 |
| 6,432,194 | B2 | * | 8/2002 | Johnson et al. | 106/499 |
| 6,478,863 | B2 | * | 11/2002 | Johnson et al. | 106/31.6 |
| 6,494,943 | B1 | * | 12/2002 | Yu et al. | 106/31.65 |
| 6,506,245 | B1 | * | 1/2003 | Kinney et al. | 106/493 |
| 2001/0003263 | A1 | * | 6/2001 | Johnson et al. | 106/413 |
| 2001/0004871 | A1 | * | 6/2001 | Johnson et al. | 106/499 |

* cited by examiner

Primary Examiner—Helene Klemanski
Assistant Examiner—Veronica F. Faison
(74) Attorney, Agent, or Firm—Fish & Richardson P.C.

(57) ABSTRACT

This invention features a hot melt ink composition. The composition includes a vehicle; a pigment having a modifying group on a surface of the pigment; and a polymeric dispersant including a group which associates with the modified surface and a backbone which is miscible with the vehicle.

35 Claims, No Drawings

PIGMENTED HOT MELT INKS

BACKGROUND

This invention relates to hot melt inks containing pigments.

Hot melt inks are solid at room temperature and liquid at temperatures above room temperature. Hot melt inks can be used, for example, in digital printing methods. During printing, the ink is heated until it becomes liquid which is then ejected through a printhead onto a substrate. The ink solidifies on the substrate.

Dyes have usually been preferred for use in hot melt inks, since they completely dissolve in the medium. Unlike pigments, they typically do not settle to the bottom of a reservoir or agglomerate to block the printhead. However, pigments have many advantages over dyes. One advantage is that pigments are more heat-stable than dyes. This can be especially important when hot melt inks are heated to an elevated temperature during printing. Another advantage is that pigments can be less likely to bleed or sublime than dyes. Therefore, there is a need for pigmented hot melt inks in which pigments are stabilized from settling or agglomerating.

SUMMARY

The present invention is based on the discovery of a hot melt ink composition that has good stability.

In one aspect, a hot melt ink composition includes a vehicle, a pigment having a surface including a modifying group, and a polymeric dispersant including a group which associates with the modifying group and a backbone which is miscible with the vehicle.

In another aspect, a hot melt ink composition includes a vehicle, a pigment having a volatile content at least 10% (e.g., at least 12%, or in a range of 14% to 22%), and a polymeric dispersant including a group which associates with the pigment and a backbone which is miscible with the vehicle.

In yet another aspect, a hot melt ink composition includes a vehicle that has a melting point at a temperature ranging from 50° C. to 150° C., a pigment that has a volatile content at least 10% and a modified surface including an oxygen-containing functionality, and a polymeric dispersant that includes a copolymer including a polyamine and a fatty acid.

A vehicle is the color-carrying medium of the ink. The vehicle can include one or more materials such as a wax or resin. The vehicle remains in a solid state at the room temperature (20° C. to 25° C.) and melts into a liquid state at temperatures above its melting point. The melting point of the vehicle can be a temperature ranging from 50° C. to 150° C. (e.g., from 65° C. to 100° C. or from 80° C. to 90° C.).

A modifying group is a heteroatom-containing group, such as, for example, hydroxyl, carboxyl, ester, ether, amino, amido, or thiol. In some embodiments, the modifying group can include an oxygen-containing functionality, such as a carboxyl or phenol group.

A polymeric dispersant includes a group that associates with the pigment or the modifying group and a backbone that is miscible with the vehicle. The polymeric dispersant can assist in stabilizing a pigment in a hot melt ink composition. By stabilizing the pigment, the pigment is less likely to agglomerate or settle in the hot melt ink composition. An example of the polymeric dispersant can include a copolymer including a polyamine and a fatty acid. The polymeric dispersant has a group that associates with the pigment or the modifying group by, for example, a non-covalent interaction, including a coulombic interaction, a hydrogen-bonding interaction, a hydrophobic interaction, or a Lewis acid-Lewis base interaction.

A pigment has a volatile content relating to a percentage of oxygen-containing functionalities on the surface of the pigment. The oxygen-containing functionalities can include, but are not limited to, carboxyl, phenol, and those contributing to a low pH value. A volatile content of a pigment can be measured by heating an unheated mass of a pigment in a sealed crucible to 950° C., and determining the postheated mass of the remaining material in the crucible. The volatile content is calculated as (1−(postheated mass/unheated mass))×100%.

In yet another aspect, a process for preparing a hot melt ink composition includes heating the hot melt ink and filtering the heated hot melt ink through a one micron filter.

The details of one or more embodiments are set forth in the description below. Other features, objects, and advantages will be apparent from the description and from the claims.

DETAILED DESCRIPTION

A pigmented hot melt ink includes a vehicle, a pigment having a surface including a modifying group, and a dispersant including a group that associates with the modifying group or the pigment and a backbone that is miscible with the vehicle.

The vehicle may include a wax. The wax provides the ink with the property of being solid at the room temperature, but liquid at an elevated temperature. The ink can melt between 50° C. and 150° C., between 65° C. and 100° C., or preferably, between 80° C. and 90° C. The pigmented hot melt ink should contain enough wax that the ink, as a whole, is a hot melt material. The vehicle may also contain a combination of waxes. The ink contains about 50% to about 90% by weight wax, e.g., about 55% to about 75% by weight wax.

Examples of waxes include, but are not limited to, stearic acid; succinic acid; beeswax; candelilla wax; carnauba wax; alkylene oxide adducts of alkyl alcohols; phosphate esters of alkyl alcohols; alpha alkyl omega hydroxy poly (oxyethylene); allyl nonanoate; allyl octanoate; allyl sorbate; allyl tiglate; rice bran wax; paraffin wax; microcrystalline wax; synthetic paraffin wax; synthetic paraffin and succinic derivatives; petroleum wax; synthetic petroleum wax; cocoa butter; diacetyl tartaric acid esters of mono and diglycerides; mono and diglycerides; alpha butyl omega hydroxypoly(oxyethylene)poly(oxypropylene); calcium pantothenate; fatty acids; organic esters of fatty acids; calcium salts of fatty acids; mono & diesters of fatty acids; sucrose fatty acid esters; calcium stearoly-2-lactylate; Japan wax; lanolin; glyceryl hydroxydecanoate; glyceryl hydroxydodecanoate; oxidatively refined montan wax fatty acids; polyhydric alcohol diesters; oleic acids; palmitic acid; d-pantothenamide; polyethylene glycol (400) dioleate; polyethylene glycol (MW 200–9,500); polyethylene (MW 200–21,000); oxidized polyethylene; polyglycerol esters of fatty acids; polyglyceryl phthalate ester of coconut oil fatty acids; shellac wax; hydroxylated soybean oil fatty acids; stearyl alcohol; and tallow and its derivatives.

The wax can be a beeswax, a carnauba wax, a paraffin wax, a synthetic paraffin wax or a microcrystaline wax.

The vehicle may include one or more resins. The resin provides the ink with a desired viscosity, thermal stability, flexibility, and adhesion properties. The ink should include enough resin to achieve the desired viscosity, stability, flexibility, and adhesion. The ink contains about 0% to about 50% by weight resin, e.g., about 20% to about 30% by weight resin.

Examples of resins include, but are not limited to, acacia (gum arabic); gum ghatti; guar gum; locust (carob) bean gum; karaya gum (sterculia gum); gum tragacanth; chicle; highly stabilized rosin ester; tall oil; manila copais; corn gluten; coumarone-indene resins; crown gum; damar gum; p, alpha-dimethylstyrene; gum elemi; ethylene oxide polymer and its adducts; ethylene oxide/propylene oxide copolymer and its adducts; galbanum resin; gellan gum; ghatti gum; gluten gum; gualac gum; guarana gum; heptyl paraben; cellulose resins, including methyl and hydroxypropyl; hydroxypropyl methylcellulose resins; isobutylene-isoprene copolymer; mastic gum; oat gum; opopanax gum; polyacrylamide; modified polyacrylamide resin; polylimonene; polyisobutylene (min. MW 37,000); polymaleic acid; polyoxyethylene derivatives; polypropylene glycol (MW 1200–3000); polyvinyl acetate; polyvinyl alcohol; polyvinyl polypyrrolidone; polyvinyl pyrrolidone; rosin, adduct with fumaric acid, pentaerythritol ester; rosin, gum, glycerol ester; rosin, gum or wood, pentaerythritol ester; rosin, gum or wood, partially hydrogenated, glycerol ester; rosin, gum or wood, partially hydrogenated, pentaerythritol ester; rosin, methyl ester, partially hydrogenated; rosin, partially dimerized, glycerol ester; rosin, partially hydrogenated; rosin and rosin derivatives; rosin, polymerized, glycerol ester; rosin, tall oil, glycerol ester; rosin, wood; rosin, wood, glycerol ester; purified shellac; styrene; styrene terpolymers; styrene copolymers; sucrose acetate isobutyrate; terpene resins, natural and synthetic; turpentine gum; vinylacetate; vinyl chloride-vinylidene chloride copolymer; zanthan gum; and zein.

The resin can be a rosin glycerol ester, an ethylene vinyl acetate (EVA), or a polyamide resins.

Additionally, in the vehicle described above, the wax, preferably, is used as a main component of the vehicle and the resin is used as an additive component thereof. The wax can be mixed with other waxes to change the vehicle characteristics, such as its polarity, so that a pigment or a dispersant is more or less soluble in the vehicle, if necessary.

The pigmented hot melt ink includes a pigment having a modifying group on a surface of the pigment. The pigment may be either an organic or inorganic pigment. The modifying group can be introduced by, for example, oxidizing the pigment. The ink may also contain a combination of pigments. The ink contains about 1% to about 35% by weight pigment, e.g., about 3% to about 10% by weight pigment.

Examples of pigments include, but are not limited to, pigment blues (PB) 15, 15:3, 15:4, 16, 22, 28, 64, 68; pigment reds (PR) 3, 4, 48, 81, 97, 113, 122, 175, 202, 217; pigment yellows (PY) 2, 7, 53, 111, 155, 151, 175, 194; pigment blacks 7, carbon black, graphite; and pigment white titanium dioxide.

The pigment can be a carbon black pigment. The carbon black pigment may have a surface including a modifying group, such as an oxygen-containing functionality (e.g., a carboxyl or phenol group). A volatile content of the carbon black pigment can be at least 10%, at least 12%, or in a range of 14% to 22%.

The pigmented hot melt ink also includes a polymeric dispersant including a group that associates with the modifying group or the pigment and a backbone that is miscible with the vehicle described above. The polymeric dispersant can assist in stabilizing the pigment in the hot melt ink. The dispersant can, for example, prevent agglomeration of the pigment. The ink can include between about 1% and 10% by weight dispersant, e.g., about 3% and 8% by weight dispersant.

Examples of dispersants include, but are not limited to, Solsperse 13,650, 13,940, 17,000; Byk 108; Tego Dispers 700; UNIQEMA 5543; and EFKA 5244, 5207, 6750; which are all commercially available from Avecia; Byk Chemie; Tego Chemie; Zephryn Uniquema; and EFKA additives, respectively.

The dispersant can be a co-polymer including a polyamine and a fatty acid, such as Solsperse 13,650. The selection of the dispersant depends on an ink composition including a vehicle and a pigment. The selected dispersant can be soluble in the vehicle, can lack of volatility at an elevated temperature (e.g., 120° C.), and can have good affinity for the pigment. The dispersant can also include a synergist that aids dispersion. An example of a suitable synergist is a substituted ammonium phthalocyanine such as Solsperse 5,000.

Additionally, the pigmented hot melt ink may include other conventional hot melt ink ingredients such as stabilizers, oils, flexibilizers, plasticizers, and other additives. Stabilizers can inhibit oxidation of the ink. Oils, flexibilizers, and plasticizers can reduce the viscosity of the ink.

Examples of stabilizers, oils, flexibilizers and plasticizers include, but are not limited to, butylated hydroxyanisole (BHA); butylated hydoxytoluene (BHT); propyl gallate; tert-butyl hydroquinone (TBHQ); ethylenediaminetetraacetic acid (EDTA); methyl paraben; propyl paraben; benzoic acid; glycerin; lecithin and modified lecithins; agar—agar; dextrin; diacetyl; enzyme modified fats; glucono deltalactone; carrot oil; chincona extract; rapeseed oil; pectins; propylene glycol; peanut oil; sorbitol; acetophenone; brominated vegetable oil; polyoxyethylene 60 sorbitan mono stearate; olestra; castor oil; oiticia oil; 1,3 butylene glycol; coconut oil and its derivatives; corn oil; substituted benzoates; substituted butyrates; substituted citrates; substituted formates; substituted hexanoates; substituted isovalerates; substituted lactates; substituted propionates; substituted isobutyrates; substituted octanoates; substituted palmitates; substituted myristates; substituted oleates; substituted stearates, distearates and tristearates; substituted gluconates; substituted undecanoates; substituted behenates; substituted succinates; substituted gallates; substituted heptanoates; substituted phenylacetates; substituted cinnamates; substituted 2-methylbutyrates; substituted tiglates; corn syrup; isoparaffinic petroleum hydrocarbons; mineral oil; glycerin; mono- and diglycerides and their derivatives; olibanum oil; opopanax oil; peanut oil; polysorbates 20, 60, 65, 80; propylene glycol mono- and diesters of fats and fatty acids; epoxidized soybean oil; hydrogenated soybean oil; sperm oil; and hydrogenated sperm oil.

A pigmented hot melt ink can be prepared by a method that is also within the scope of this invention. The method includes combining all of the ink ingredients except for a resin; heating the resulting combination to a temperature above its melting point and milling; mixing the resin with the liquified combination; and filtering the mixture through a 1 μm filter.

The hot melt ink can be used with a conventional hot melt ink jet printer, such as a MARKEM model 5000 inkjet printer.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are hereby incorporated by reference in their entirety.

Additionally, these inks were able to be milled to a submicron size range.

As shown in Table 2, pigmented hot melt inks of this invention were on average 25% more optically dense (bolder) than their dye-based counterparts.

TABLE 1

Stability test on pigmented hot melt inks.

| No. | Pigment | Manufacturer | Parts | % Volitiles | Dispersant | Parts | Manufacturer | Filter to 1$\mu$ | Stability @ 120° C. |
|---|---|---|---|---|---|---|---|---|---|
| 1 | FW200 | Degussa Corporation | 4 | 21.5 | Solsperse 13650 | 8 | Avecia | Yes | Very Stable |
| 2 | FW200 | Degussa Corporation | 4 | 21.5 | BYK 108 | 8 | Byk-Chemie | Yes | Very Stable |
| 3 | FW200 | Degussa Corporation | 4 | 21.5 | Solsperse 17000 | 8 | Avecia | Yes | Very Stable |
| 4 | FW200 | Degussa Corporation | 4 | 21.5 | None | 0 |  | No | Not Stable |
| 5 | Special Black 6 | Degussa Corporation | 4 | 18 | Solsperse 13650 | 5 | Avecia | Yes | Very Stable |
| 6 | FW2 | Degussa Corporation | 4 | 17 | Solsperse 13650 | 8 | Avecia | Yes | Very Stable |
| 7 | Special Black 5 | Degussa Corporation | 4 | 15 | Solsperse 13650 | 4 | Avecia | Yes | Very Stable |
| 8 | Special Black 4A | Degussa Corporation | 4 | 14.5 | Solsperse 13650 | 4 | Avecia | Yes | Very Stable |
| 9 | Special Black 4A | Degussa Corporation | 4 | 14.5 | None | 0 |  | No | Not Stable |
| 10 | Monarch 1400 | Cabot Corporation | 4 | 9.5 | Solsperse 13650 | 8 | Avecia | No | Not Stable |
| 11 | FW18 | Degussa Corporation | 4 | 4.5 | Solsperse 13650 | 4 | Avecia | No | Not Stable |
| 12 | Special Black 250 | Degussa Corporation | 4 | 3.5 | Solsperse 13650 | 3 | Avecia | No | Not Stable |
| 13 | Special Black 100 | Degussa Corporation | 4 | 3.5 | Solsperse 13650 | 1 | Avecia | No | Not Stable |
| 14 | Printex 90 | Degussa Corporation | 4 | 1.2 | Solsperse 13650 | 5 | Avecia | No | Not Stable |

EXAMPLE

Preparing and Testing Pigmented Hot Melt Inks

A hot melt ink was prepared as follows: Beeswax was loaded into a heated flask. A dispersant, parts indicated in Table 1, was added with stirring. A pigment, 4 parts by weight, was added slowly with stirring. The resulting solution was mixed using a Cowles type blade at 1000 rpm for one hour to wet and pre-disperse the pigment. The solution was then loaded into a horizontal media mill, grounded at 2000 rpm for 2 hours at 120° C., and removed from the mill. A resin, rosin ester resin, 24 parts by weight, was mixed with the solution with light stirring. The mixture was then filtered through a one micron glass fiber filter. Note that the beeswax was made up the rest of 100 parts.

The stability of the ink was tested by placing the test ink in a test tube which was placed into an oven at 120° C. Ink remained undisturbed for up to 4 weeks. At that point ink was evaluated for the presence of a lighter shade or clear fluid on top surface of ink sample. The bottom of the ink sample was evaluated for any signs of pigment settling, agglomeration or increased concentration of pigment relative to top of sample. Samples were also evaluated for change in particle size by optical microscopy. Stable samples show little if any change in pigment concentration from top of sample to bottom and no discernable change in particle size under the optical microscope. Non-stable samples show large changes and usually display a clear fluid at the top of the test tube.

Unexpectedly, as shown in Table 1, all inks filtered through a 1 $\mu$m filter were very stable, remaining stable (e.g., no settlement or agglomeration) at 120° C. for as long as four weeks. In addition, inks were not stable if they included no dispersant (No. 4 and No. 9) or included a pigment having a volatile content lower than 10% (Nos. 10–14). On the other hand, inks were very stable if they included a dispersant having a volatile content at least 10%.

TABLE 2

Optical density test on pigmented hot melt inks.[$]

| | Macbeth Optical Density | | |
|---|---|---|---|
| DPI | Dye-based Ink | Pigmented Ink | % Difference |
| 300 | 0.87 | 1.08 | 24.1 |
| 450 | 0.99 | 1.27 | 28.3 |
| 600 | 1.15 | 1.42 | 23.5 |
| 750 | 1.21 | 1.51 | 24.8 |

[$]The data were obtained using a MARKEM Model 5000 Inkjet Printer at the resolution (in dpi) indicated. In each case a block image was generated and later measured using a Macbeth ® Model RD922 Optcial Densitometer.

Other Embodiments

All of the features disclosed in this specification may be combined in any combination. Each feature disclosed in this specification may be replace by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the methods and compositions described above, and without departing from the spirit and scope thereof, can make various changes and modifications to adapt the to various usages and conditions. Accordingly, other embodiments are also within the scope of the following claims.

What is claimed is:

1. A hot melt ink composition comprising:
   a vehicle;
   a pigment having a surface including a modifying group; and
   a polymeric dispersant including a group which associates with the modifying group and a backbone which is miscible with the vehicle.

2. The hot melt ink composition of claim 1, wherein the vehicle has a melting point at a temperature ranging from 50° C. to 150° C.

3. The hot melt ink composition of claim 2, wherein the vehicle has a melting point at a temperature ranging from 65° C. to 100° C.

4. The hot melt ink composition of claim 3, wherein the vehicle has a melting point at a temperature ranging from 80° C. to 90° C.

5. The hot melt ink composition of claim 1, wherein the modifying group includes an oxygen-containing functionality.

6. The hot melt ink composition of claim 5, wherein the oxygen-containing functionality is a carboxyl or phenol group.

7. The hot melt ink composition of claim 1, wherein the polymeric dispersant includes a copolymer including a polyamine and a fatty acid.

8. The hot melt ink composition of claim 7, wherein the melting point of the vehicle is at a temperature ranging from 80° C. to 90° C.

9. The hot melt ink composition of claim 8, wherein the modifying group includes an oxygen-containing functionality.

10. The hot melt ink composition of claim 9, wherein the oxygen-containing functionality is a carboxyl or phenol group.

11. A hot melt ink composition comprising:
   a vehicle;
   a pigment having a volatile content at least 10%; and
   a polymeric dispersant including a group which associates with the pigment and a backbone which is miscible with the vehicle.

12. The hot melt ink composition of claim 11, wherein the vehicle has a melting point at a temperature ranging from 50° C. to 150° C.

13. The hot melt ink composition of claim 12, wherein the vehicle has a melting point at a temperature ranging from 65° C. to 100° C.

14. The hot melt ink composition of claim 13, wherein the vehicle has a melting point at a temperature ranging from 80° C. to 90° C.

15. The hot melt ink composition of claim 11, wherein the volatile content is at least 12%.

16. The hot melt ink composition of claim 15, wherein the volatile content is between 14% and 22%.

17. The hot melt ink composition of claim 11, wherein the polymeric dispersant includes a copolymer including a polyamine and a fatty acid.

18. The hot melt ink composition of claim 17, wherein the vehicle has a melting point at a temperature ranging from 80° C. to 90° C.

19. The hot melt ink composition of claim 18, wherein the volatile content is at least 12%.

20. The hot melt ink composition of claim 19, wherein the volatile content is between 14% and 22%.

21. The hot melt ink composition of claim 11, wherein the pigment has a surface including an oxygen-containing functionality.

22. The hot melt ink composition of claim 21, wherein the oxygen-containing functionality is a carboxyl or phenol group.

23. The hot melt ink composition of claim 22, wherein the polymeric dispersant is a copolymer including a polyamine and a fatty acid.

24. The hot melt ink composition of claim 23, wherein the vehicle has a melting point at a temperature ranging from 80° C. to 90° C.

25. A hot melt ink composition comprising:
   a vehicle having a melting point at a temperature ranging from 50° C. to 150° C.;
   a pigment having a volatile content at least 10% and a surface including an oxygen-containing functionality; and
   a polymeric dispersant including a copolymer of a polyamine and a fatty acid.

26. A process for preparing a hot melt ink composition, comprising:
   heating a hot melt ink including a vehicle, a pigment having a surface including a modifying group, and a polymeric dispersant including a group which associates with the modifying group and a backbone which is miscible with the vehicle; and
   filtering the heated hot melt ink through a one micron filter.

27. The process of claim 26, wherein the vehicle has a melting point at a temperature ranging from 50° C. to 150° C.

28. The process of claim 27, wherein the melting point is at a temperature ranging from 65° C. to 100° C.

29. The process of claim 28, wherein the melting point is at a temperature ranging from 80° C. to 90° C.

30. The process of claim 26, wherein the modifying group includes an oxygen-containing functionality.

31. The process of claim 30, wherein the oxygen-containing functionality is a carboxyl or a phenol group.

32. The process of claim 26, wherein the pigment has a volatile content at least 10%.

33. The process of claim 32, wherein the volatile content is at least 12%.

34. The process of claim 33, wherein the volatile content is between 14% and 22%.

35. The process of claim 26, wherein the polymeric dispersant includes a copolymer including a polyamine and a fatty acid.

* * * * *